Jan. 11, 1955

C. H. MINER 2,699,071

VARIABLE PITCH V-TYPE PULLEY

Filed Aug. 11, 1952

INVENTOR.
Charles H. Miner
BY
Martin E. Anderson
ATTORNEY

Jan. 11, 1955 C. H. MINER 2,699,071
VARIABLE PITCH V-TYPE PULLEY
Filed Aug. 11, 1952 3 Sheets-Sheet 2

INVENTOR.
Charles H. Miner
BY
Martin E. Anderson
ATTORNEY

Jan. 11, 1955
C. H. MINER
2,699,071
VARIABLE PITCH V-TYPE PULLEY
Filed Aug. 11, 1952
3 Sheets-Sheet 3
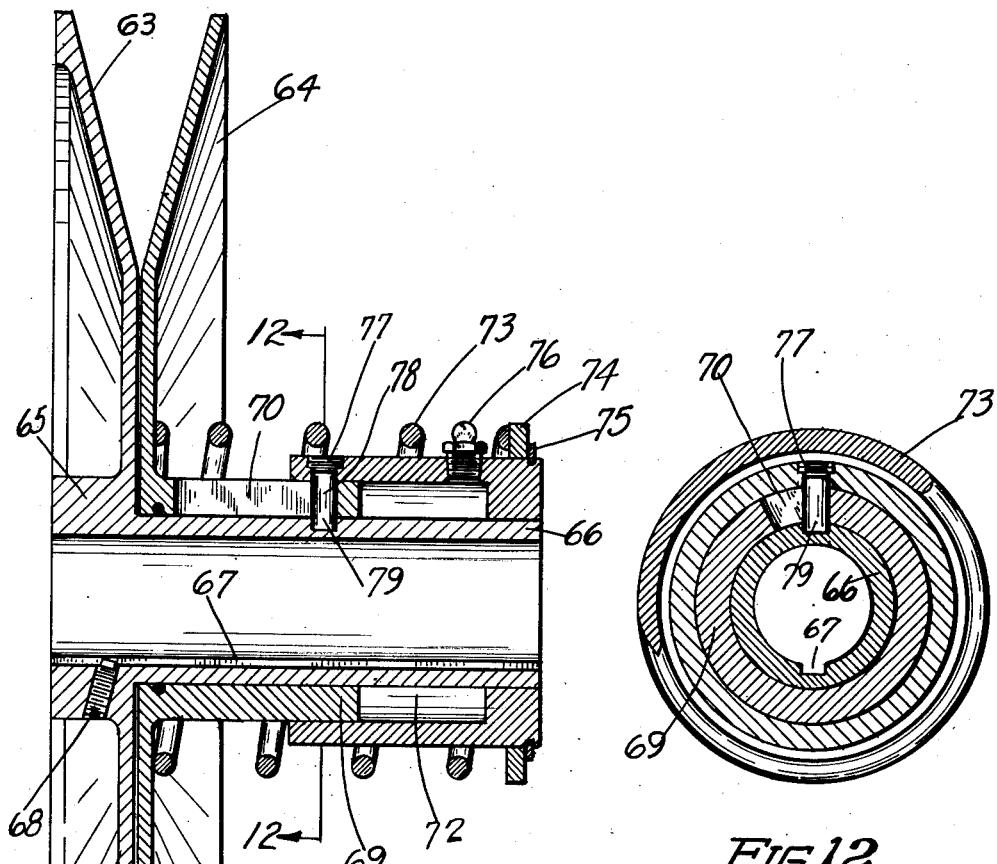
FIG.11.
FIG.12.
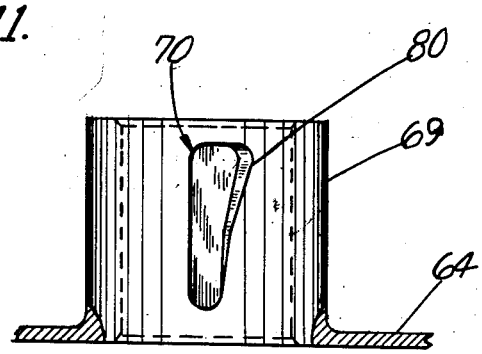
FIG.13.
INVENTOR.
Charles H. Miner
BY
Marlin E. Anderson
ATTORNEY

United States Patent Office 2,699,071
Patented Jan. 11, 1955

2,699,071

VARIABLE PITCH V-TYPE PULLEY

Charles Hugh Miner, Denver, Colo., assignor, by mesne assignments, to Miner Pulley & Transmission Co., a corporation of Colorado Application August 11, 1952, Serial No. 303,694

4 Claims. (Cl. 74—230.17)

This invention relates to V-type pulleys, used to vary speeds and/or torques, and that may comprise either driving or driven mechanisms.

More particularly, the present invention is concerned with an improvement that may be incorporated in pulleys of the variable speed type in association with either spring means or centrifugal means, or both.

The invention is especially useful in combinations where the pulley sections are urged against a V-belt by a spring. In the past, such springs have been relatively heavy for insuring starting, thereafter becoming undesirably strong when compressed and thus squeezing the belt so hard as to cause excessive wear as well as power loss. In some cases, centrifugal devices have been employed to act in opposition to the springs. By the present invention these difficulties and disadvantages are eliminated through use of a simple cam-like connection between the pulley sections. It permits use of a very light compression spring.

It is the primary objection of my invention to devise an uncomplicated but effective connection between a pair of pulley sections that will permit small amounts of relative oscillation, and that in doing so will resist separational movement. It follows, that as the load is increased, such a connection will assist the spring in its effort to close the pulley against the belt. In other words the connection is designed to respond to variations in belt tension as produced by changes in applied torque and load, with automatic adjustment.

Another major object is to construct a connection of the above character in the form of a pin or a combined roller and pin, and a slot parallel to the axis of rotation, the slot having at least a portion of one side inclined. In this regard, it is a further object to make one end of the slot considerably wider than the diameter of the pin unit.

Still another important object of this invention is to design a pin and slot connection, of the type mentioned, in which the loaded or closing side of the slot is notched at one or more points to latch the pin unit under certain conditions. This is particularly useful in a vehicle drive, for utilizing the engine as a brake, and also for reversing the direction of travel.

The foregoing and further important objects should become clearly apparent from a study of the following detailed description when taken in conjunction with the accompanying drawings and the appended claims.

In the drawings:

Figure 11 is a longitudinal sectional view of another modified form.

Figure 12 is a cross section taken along line 12—12, Figure 11.

Figure 13 is a plan view of the slotted pulley hub of Figures 11 and 12.

Figure 1:
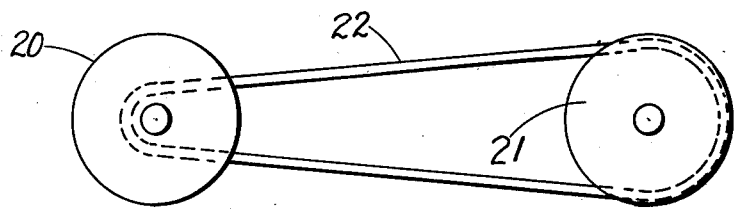
Figures 1 and 2 illustrate, diagrammatically and in side elevation, two positions of a pair of belt-driven pulleys of the type with which this invention is concerned.
Figure 2:
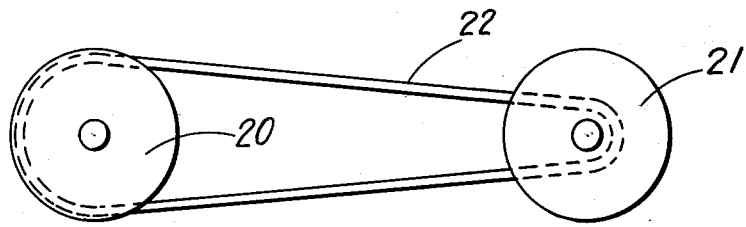

With continued reference to the drawings, and with particular reference first to Figures 1 and 2, there is shown a pair of V-pulleys 20, 21 encompassed by a V-belt 22. The two positions represent two different drive-load conditions. Either of them may be of the type hereinafter described. One of them may be of centrifugally operable design such, for example, as disclosed in my Patent No. 2,553,505. It may be assumed that one of them is driven by a vehicle engine or an electric motor, and that the other is connected to a load.

Figure 3:
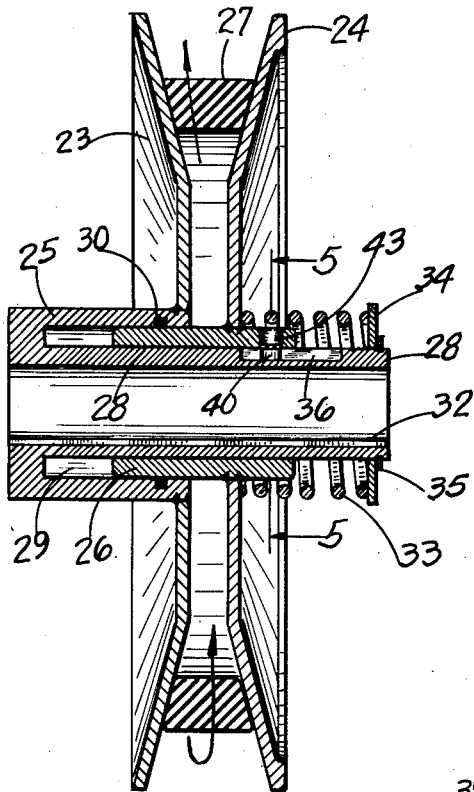
Figure 3 represents a section taken longitudinally and axially of one type of pulley with a first embodiment of this invention incorporated.
Figure 5:
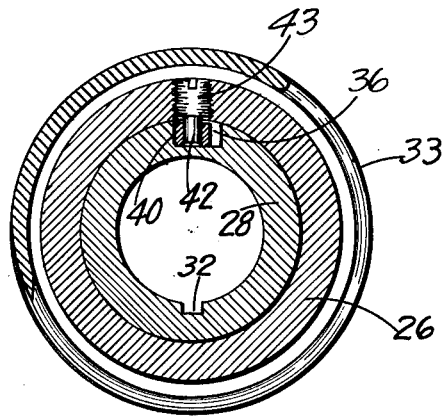
Figure 5 is a cross sectional view taken along line 5—5, Figure 3.
Figure 4:
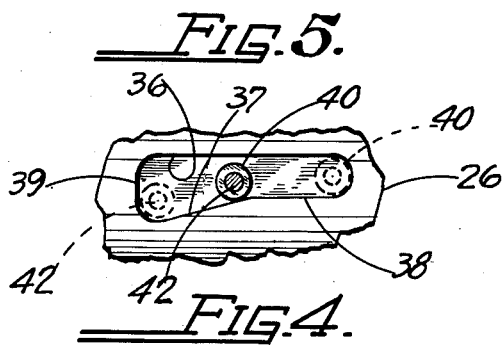
Figure 4 is a fragmentary view, in plan, of the slotted portion of one of the pulley hubs of Figure 3.

Figures 3–5 illustrate an embodiment comprising a pair of conventional V-disc sections 23, 24, welded or otherwise rigidly joined with a pair of telescoped hubs, 25 and 26, respectively, the discs designed to cooperate with endless V-belt 27. The hub 25 has an integral reversed sleeve 28 forming with the other hub a lubrication pocket 29, sealed by an annular ring 30.

The sleeve 28 is grooved at 32 for keying it to a driving shaft (not shown). A compressed spring 33 urges the sections 23, 24 towards each other, this spring being held in compression by a washer 34 and a snap ring 35. The spring 33 is not broadly new, but it is novel and very important in the respect that it may be much lighter (i. e. possesses much less strength) than springs previously utilized in similar combinations.

Except for the spring lightness just emphasized, the invention resides in a cam-like connection between the two pulley discs and now to be described.

The hub sleeve 28 has a recess, generally indicated by the numeral 36, formed therein. It may be simply a groove or it may be an opening going entirely through the sleeve. Hereafter it will be termed a "slot," which word is intended to be generic to any cam-shaped groove or opening. This slot has an inclined side portion 37, and a straight portion 38 that is parallel to the axis of rotation. It also has a circumferentially disposed end 39, considerably wider than the straight portion 38.

A hollow roller 40, of a diameter approximately equal to the width of portion 38, is free to glide around the slot 36 within the confines thereof. It is rotatably mounted on a pin 42 that is an integral extension of a screw 43 set into the hub 26. In this manner the pulley discs may have relative rotation to the extent permitted by the width of end 39, but are interlocked when the roller 40 enters the straight portion 38 of the slot.

When the belt 27 is placed under tension, either to drive or be driven, it tends to separate the discs 23, 24, which normally would rotate in unison. However, in starting a load by power applied to sleeve 28 by a driving shaft that turns sleeve 28 in a clockwise direction, when viewed as in Figure 5, pin 42 will move into the dotted line position shown in Figure 4, due to a slight slippage of the belt 27 along one or both of the pulley sections. When the pulley sections move farther apart roller 40 must move outwardly along inclined side 37 which requires the pulley sections to slip with respect to the belt. This ride of the roller increases progressively with spread of the discs, until the roller goes into the straight portion 38 of the slot, the drive then becoming absolutely direct.

The action just described is of great advantage, particularly when starting under load. A heavy spring is unnecessary and the load is picked up without radial "surge" of the belt. The discs separate smoothly and then are held against the belt with just sufficient force by the light spring 33 to transmit the load. Even with this light spring the pulley will not jump open under suddent load; and with such a spring there is a great reduction of power loss suffered in prior designs. The angular slot restricts opening of the pulley on overload. As the load changes gradually, the roller rides against the incline 37, and the torque exerted by inclined side 37 on roller 40 produces an axial component that tends to close the pulley, thus assisting the very light spring in its action.

Figure 6:
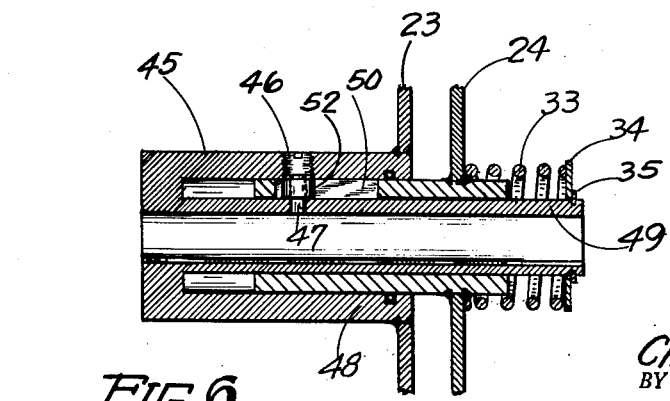
Figure 6 is a view similar to Figure 3, but in quarter section, of a modified form of the invention.

Figure 6 is presented to show how the structure of Figures 3–5 may be revamped to place the pin and slot connection in the lubricated and sealed portion of the device. Here there is a longer hub, 45, for the disc 23. It carries a more conveniently accessible screw 46 that has a pin 47 extending through the hub 48 and into the sleeve 49 for double anchorage. A slot 50, corresponding to slot 36 of Figures 3–5, entertains a corresponding roller 52 carried on the pin 47.

Figure 7:
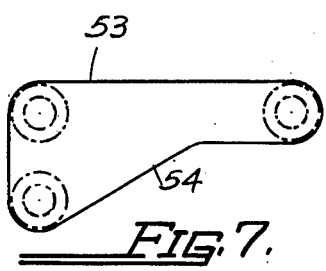
Figures 7–10 illustrate four of many other shapes that may be given to the slot of Figure 4.

There are many possible modifications for the shape of the slot, it being essential only that there be an inclined portion, either straight or curved, merging into a zone (axial groove or a point) where the pulley sections become interlocked. The degree of inclination is determined from the torque to be applied or transmitted through the belt. For example, the slot 53 of Figure 7 differs only in that the slanted side 54 has a greater inclination to handle lighter loads.

Figure 8:
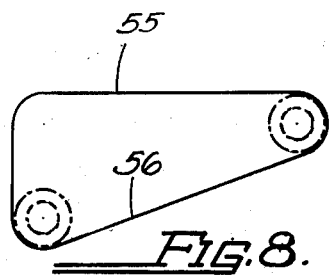
Figure 9:
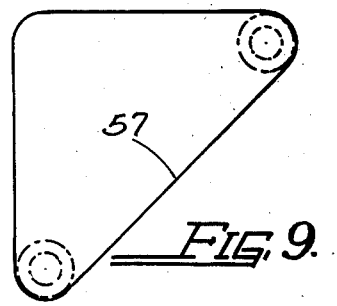

Figure 8 discloses a slot 55 in which the roller may travel on an incline 56 all the way from one end of the slot to the other. Figure 9 differs only in that the degree of inclination is considerably increased in the slanted side 57.

Figure 10:
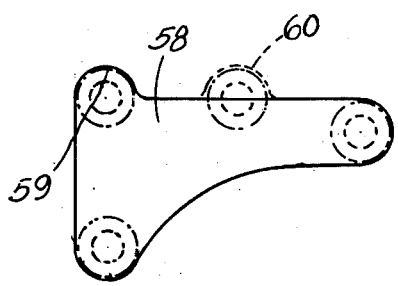

The slot 58 of Figure 10 differs greatly and importantly from the others in that it has a semi-cylindrical notch 59 into which the roller may be latched upon sudden reversal of torque. For example, in a vehicle driven by a combustion engine, should the accelerator be cut off while the wheels are connected to the engine, the latter will serve as a brake when the roller jumps into the notch 59. This notch of course may take other positions along the straight side of the slot as, for example, at 60. Also, more than one notch may be provided for the same slot to meet varying operational conditions.

If sleeve 28 is splined to a driven shaft and hub 26 is rotated in a clockwise direction, when viewed as in Figure 5 or when it moves upwardly when viewed as in Figure 4, by power transmitted to the pulley sections 23 and 24, roller 40 will engage the inclined side 37 and transmit torque to sleeve 28 and this torque force will be resolved into two components one acting in a plane perpendicular to the axis of rotation and the other in an axial direction, tending to move pulley sections 23 and 24 closer together.

Turning now to Figures 11 and 12, a further modification is illustrated. It comprises the usual disc sections 63, 64, the first of which has a hub integral with the elongated sleeve 66 that is channeled at 67 for cooperation with a spline on a rotary driving shaft (not shown). A set screw 68 is provided to secure the sleeve against accidental longitudinal movement on the shaft. Disc 64 has a hub 69 provided with a cam slot 70 (as shown in Figure 13) corresponding to those previously described. In order to obtain pulley closure, a cuplike sleeve 72 is telescoped with a pressed fit onto the end of sleeve 66 and has a sliding fit over hub 69. A light compression spring 73 is provided to react between discs 64 and a washer 74 to normally return the parts to the position shown in Figure 11. The spring is secured by a snap ring 75, and the assembled parts are lubricated by a grease fitting 76.

A screw 77 is anchored in the sleeve 72 to position a cylindrical pin 79 that extends through the slot 70 with a rolling fit within a hole 79 in the sleeve 66. The two sleeves of course could be threaded or welded together. Here, as in Figure 6, the slot moves and acts against the roller unit instead of vice versa, as in Figures 3–5. Slot 70 has the essential inclined side portion 80, and of course a roller could surround the pin, if desired.

It will be seen that, in all embodiments of the invention the pulley discs oscillate relative to each other only when the belt slips along at least one disc, and that when this action takes place in the direction of belt pull, the belt must either move farther out from the axis of rotation or be transversely compressed. The result of this is that as there is a strong tension in the belt the pulley discs will not spread, but when higher speeds are attained and the tension reduced the pin (or roller) and slot can cooperate to permit the pin to ride over the incline and into the straight portion or the snug end of the slot, the device then functioning in the manner of the well known "Reeves" type pulley.

The reason for making the slot with one side parallel with the axis of rotation is that if both sides of the slot were inclined the two pulley sections would have to rotate relative to each other when they approached each other and this would require a more powerful spring 33 because it would have to develop a torque component sufficient to make the pulley sections slip on the belt surface, whereas with one side parallel with the axis of rotation and the other or driving side inclined the strength of the spring can be greatly reduced.

Obviously, changes may be made without departing from the spirit of the invention and, therefore, I wish to be limited only by a reasonably liberal interpretation of the claims.

What is claimed is:

1. In a V-type expansible pulley, a pair of axially adjustable disc sections, and mechanism for coupling them together for rotation, comprising a pair of telescoped members secured centrally to said sections, a substantially radial pin unit carried by one of said members, the other member having a slot arranged generally parallel to the axis of rotation and complemental to said pin unit for reception thereof, said slot having one side substantially parallel with the axis of rotation and at least a portion of the other side beginning at one end of the slot inclined towards the first mentioned side.

2. In combination, a V-type variable pulley comprising a pair of axially separable discs; means mounting said discs for movement, both axially and rotationally; spring means of unusually low strength urging said discs toward each other; said mounting means embodying a pin and slot type of interconnection, the slot having one side substantially parallel with the axis of rotation, one end of the slot being wider than the other, the side opposite the first mentioned side, beginning at the wider end, being inclined towards the first mentioned side.

3. A device in accordance with claim 2 in which the first mentioned side is provided with a notch at its intersection with the wide end.

4. A device in accordance with claim 3 in which the inclined side terminates in a portion parallel with the first mentioned side forming a slot portion with two parallel sides.

References Cited in the file of this patent

UNITED STATES PATENTS

| | | |
|---|---|---|
| 1,279,547 | Hueber | Sept. 24, 1918 |
| 1,795,520 | Steckroth | Mar. 10, 1931 |
| 2,173,661 | Perrine | Sept. 19, 1939 |
| 2,543,510 | Sandberg | Feb. 27, 1951 |